United States Patent
Huang et al.

(10) Patent No.: US 11,377,508 B2
(45) Date of Patent: Jul. 5, 2022

(54) TEMPERATURE-RESPONSIVE POLY(2-HYDROXYETHYL METHACRYLATE) (PHEMA) AND PREPARATION METHOD THEREOF

(71) Applicant: CHANGZHOU UNIVERSITY, Changzhou (CN)

(72) Inventors: Wenyan Huang, Changzhou (CN); Di Zhu, Changzhou (CN); Bibiao Jiang, Changzhou (CN); Xiaoqiang Xue, Changzhou (CN); Hongjun Yang, Changzhou (CN); Li Jiang, Changzhou (CN); Qimin Jiang, Changzhou (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 0 days.

(21) Appl. No.: 17/414,969

(22) PCT Filed: Dec. 29, 2020

(86) PCT No.: PCT/CN2020/140468
§ 371 (c)(1),
(2) Date: Jun. 17, 2021

(87) PCT Pub. No.: WO2121/196778
PCT Pub. Date: Oct. 7, 2021

(65) Prior Publication Data
US 2022/0041770 A1 Feb. 10, 2022

(30) Foreign Application Priority Data
Apr. 3, 2020 (CN) .......................... 202010257834.6

(51) Int. Cl.
*C08F 20/20* (2006.01)
*C08L 33/14* (2006.01)
(Continued)

(52) U.S. Cl.
CPC .............. *C08F 120/20* (2013.01); *C08F 2/32* (2013.01); *C08F 4/40* (2013.01); *C08F 20/20* (2013.01); *C08L 33/14* (2013.01); *C08L 2666/68* (2013.01)

(58) Field of Classification Search
None
See application file for complete search history.

(56) References Cited

U.S. PATENT DOCUMENTS

2004/0266965 A1 12/2004 Holguin et al.
2014/0370114 A1 12/2014 Lee et al.

FOREIGN PATENT DOCUMENTS

CN 101550202 A 10/2009
CN 106573997 A 4/2017
(Continued)

OTHER PUBLICATIONS

Martin Pradny, et al., Electrospinning of the hydrophilic poly (2-hydroxyethyl methacrylate) and its copolymers with 2-ethoxyethyl methacrylate, Central European Journal of Chemistry, 2007, pp. 779-792, 5(3).
(Continued)

*Primary Examiner* — Richard A Huhn
(74) *Attorney, Agent, or Firm* — Bayramoglu Law Offices LLC

(57) ABSTRACT

Temperature-responsive poly(2-hydroxyethyl methacrylate) (PHEMA) and a preparation method thereof are disclosed. In the preparation method, with a system consisting of benzoyl peroxide (BPO) (an oxidant) and 2-methyl-N-[3-(methyl-phenyl-amino)-propyl]-acrylamide (MPAEMA) or 2-methyl-N-[3-(methyl-phenyl-amino)-propyl]-propionamide (MEMA) (a reducing agent monomer) as a redox initiation system, water and toluene as media, a nonionic surfactant as an emulsifier, and 2-hydroxyethyl methacrylate (HEMA) as a polymerization monomer, polymerization is (Continued)

conducted at room temperature and atmospheric pressure to obtain the PHEMA. An alcohol solution of the PHEMA has an upper critical solution temperature (UCST). The method has the advantages of simple and stable polymerization system, low polymerization cost, easy operation, mild conditions, small impact on the environment, and low energy consumption. Moreover, a molecular weight and UCST of a product are controllable within a specified range.

10 Claims, 2 Drawing Sheets

(51) Int. Cl.
    *C08F 2/32* (2006.01)
    *C08F 4/40* (2006.01)
    *C08F 120/20* (2006.01)

(56) References Cited

FOREIGN PATENT DOCUMENTS

| | | |
|---|---|---|
| CN | 111393562 A | 7/2020 |
| GB | 841127 A | 7/1960 |
| WO | 2005103091 A1 | 11/2005 |

OTHER PUBLICATIONS

Qimin Jiang, et al., Radical Polymerization in the Presence of Peroxide and Reducing Agent Monomer for Branched Polymers, Journal of Polymer Science, Part A: Polymer Chemistry, 2019, pp. 833-840, 57.

Ryan Longenecker, et al., Thermally Responsive 2-Hydroxyethyl Methacrylate Polymers: Soluble-Insoluble and Soluble-Insoluble-Soluble Transitions, Macromolecules, 2011, pp. 8962-8971, 44.

Simonida L.J. Tomic, et al., Swelling and thermodynamic studies of temperature responsive 2-hydroxyethyl methacrylate/itaconic acid copolymeric hydrogels prepared via gamma radiation, Radiation Physics and Chemistry, 2007, pp. 1390-1394, 76.

TEMPERATURE-RESPONSIVE POLY(2-HYDROXYETHYL METHACRYLATE) (PHEMA) AND PREPARATION METHOD THEREOF

CROSS REFERENCE TO THE RELATED APPLICATIONS

This application is the national phase entry of International Application No. PCT/CN2020/140468, filed on Dec. 29, 2020, which is based upon and claims priority to Chinese Patent Application No. 202010257834.6, filed on Apr. 3, 2020, the entire contents of which are incorporated herein by reference.

TECHNICAL FIELD

The present disclosure belongs to the field of functional polymer preparation in polymer synthesis, and specifically relates to temperature-responsive poly(2-hydroxyethyl methacrylate) (PHEMA) and a preparation method thereof.

BACKGROUND

Intelligent materials are new materials that integrate self-detection, self-determination, and self-processing functions, which can perceive and respond to the environment. As an important and potential intelligent material, temperature-responsive polymers have been extensively developed and utilized in the fields of drug release, tissue engineering, separation and purification, and the like. Temperature-responsive polymers can be divided into lower critical solution temperature (LCST) type and upper critical solution temperature (UCST) type.

LCST polymers refer to a type of polymer where a polymer solution will change from clear to turbid or a polymer hydrogel will change from swelling to shrinking with an increase in temperature, and the temperature at which the solution or hydrogel undergoes abrupt change is LCST. Poly(N-isopropylacrylamide) (PNIPAM) is a typical LCST polymer.

In contrast, UCST polymers refer to a type of polymer where a polymer solution will change from clear to turbid or a polymer hydrogel will change from swelling to shrinking with a decrease in temperature, and the temperature at which the solution or hydrogel undergoes abrupt change is UCST. At present, common UCST polymers include polymethacrylamide (PMAM), poly(N-acryloyl glycinamide) (PNAGA), polyacrylamide (PAM), a copolymer thereof. Most of these polymers only show a UCST response when in the form of cross-linked hydrogel swollen in water, and the formation of a cross-linked structure means that a polymer cannot be reshaped.

PHEMA has the advantages of high light transmittance, high water absorption, non-toxicity, etc., but due to current insufficient control on a polymerization process of PHEMA, synthesized products are mostly low-molecular-weight linear PHEMA or cross-linked PHEMA hydrogel.

SUMMARY

The present disclosure is intended to provide temperature-responsive PHEMA and a preparation method thereof. The method involves simple reaction system, easy operation, and high polymerization rate and leads to high-molecular-weight PHEMA. In the preparation method, with a system consisting of benzoyl peroxide (BPO) (an oxidant) and 2-methyl-N-[3-(methyl-phenyl-amino)-propyl]-acrylamide (MPAEMA) or 2-methyl-N-[3-(methyl-phenyl-amino)-propyl]-propionamide (MEMA) (a reducing agent monomer) as a redox initiation system, water and toluene as media, a nonionic surfactant as an emulsifier, and 2-hydroxyethyl methacrylate (HEMA) as a polymerization monomer, free-radical inverse emulsion polymerization is conducted at room temperature to obtain the temperature-responsive PHEMA. The method involves a simple polymerization system, easy operations, and short reaction time. The absorbance-temperature curves of PHEMA solutions during a temperature decreasing process are determined by an ultraviolet (UV)-visible spectrophotometer, and it is found that a solution of the PHEMA in i-propanol or n-propanol undergoes an abrupt increase in absorbance during a temperature decreasing process at a specified temperature range, while a solution of the PHEMA in methanol or ethanol undergoes no significant change in absorbance during a temperature decreasing process from 40° C. to 0° C.

The MPAEMA is prepared by a method including: dissolving N-(3-aminopropyl)-N-methylaniline (commercially available), triethylamine (TEA), and methacryloyl chloride (MAC) in tetrahydrofuran (THF) separately to obtain dilute solutions with a concentration of 1 g/10 mL; mixing the N-(3-aminopropyl)-N-methylaniline solution with the TEA solution at 0° C. to 5° C., slowly adding the MAC solution dropwise to a resulting mixture while the mixture is vigorously stirred, and conducting reaction for 24 h; filtering a resulting system to obtain a filtrate, and removing the solvent from the filtrate by rotary evaporation to obtain a crude product; and dissolving the crude product in diethyl ether, and adding a resulting solution dropwise to cold n-hexane for recrystallization to obtain the reducing agent monomer MPAEMA, where the N-(3-aminopropyl)-N-methylaniline, TEA, and MAC have a molar ratio of 4:6:5.

The MEMA is prepared by a method including: dissolving N-(3-aminopropyl)-N-methylaniline (commercially available), TEA, and isobutyryl chloride in THF separately to obtain dilute solutions with a concentration of 1 g/10 mL; mixing the N-(3-aminopropyl)-N-methylaniline solution with the TEA solution at 0° C. to 5° C., slowly adding the isobutyryl chloride solution dropwise to a resulting mixture while the mixture is vigorously stirred, and conducting reaction for 24 h; filtering a resulting system to obtain a filtrate, and removing the solvent from the filtrate by rotary evaporation to obtain a crude product; and dissolving the crude product in diethyl ether, and adding a resulting solution dropwise to cold n-hexane for recrystallization to obtain the model reducing agent MEMA, where the N-(3-aminopropyl)-N-methylaniline, TEA, and isobutyryl chloride have a molar ratio of 1:1.5:1.2.

An aqueous solution of the monomer has a concentration of 25%; a molar ratio of the oxidant to the reducing agent is 1:1; a molar ratio of the reducing agent monomer to the polymerization monomer is 1:80 to 1:200; and a mass ratio of the water to the toluene is 1:1.

The nonionic surfactant is a compound emulsifier of polyoxyethylene (20) sorbitan monooleate and sorbitane trioleate, herein Tween® 80 and Span® 85, where a total mass of Tween® 80 and Span® 85 is 10% of a mass of toluene, and a mass ratio of Tween® 80 to Span® 85 is 1:1.

The polymerization is conducted at 25° C. for 1 h to 8 h.

The prepared PHEMA has a weight average molecular weight (WAMW) of 133,000 g/mol to 2,442,000 g/mol; the PHEMA is used for temperature-responsive intelligent materials; and a solution of the PHEMA in i-propanol or n-propanol undergoes an abrupt increase in absorbance during a temperature decreasing process at a specified temperature range, indicating a temperature response.

The PHEMA has a concentration of 1 mg/mL to 15 mg/mL in the propanol solution;

the temperature response test is conducted at a temperature range of 0° C. to 40° C. for the PHEMA solution;

the absorbance of the PHEMA solution undergoes an abrupt change at a temperature range of 2° C. to 25° C.; and the propanol solution of the PHEMA has a cloud point of 2° C. to 23° C.

In the present disclosure, with a system consisting of BPO and MPAEMA (or MEMA) as a redox initiation system, the polymerization of HEMA is initiated at room temperature and atmospheric pressure under inverse emulsion polymerization conditions to obtain the temperature-responsive PHEMA. Appropriate inverse emulsion polymerization conditions lead to high polymerization rate, short reaction time, and high monomer conversion rate. The obtained PHEMA has a high molecular weight, whose molecular weight and UCST can be adjusted according to polymerization conditions. The whole system is simple and stable and requires mild conditions and easy operations, which is suitable for being popularized in large-scale applications.

Compared with the prior art, the present disclosure has the following beneficial technical effects.

1. The reducing agent monomer used in the method of the present disclosure is easy to synthesize and purify. The entire reaction system is simple and stable and involves mild conditions, no temperature control, simple and easy operations, small impact on the environment, and low energy consumption, which is suitable for industrialized large-scale production.

2. The method of the present disclosure has short reaction time and high monomer conversion rate, and the obtained PHEMA has a high molecular weight that can be adjusted in a wide range.

3. In the present disclosure, PHEMA with high molecular weight is synthesized by inverse emulsion polymerization, and a UCST response of the PHEMA has been observed for the first time in i-propanol or n-propanol. The PHEMA can be used as a temperature-responsive intelligent material, which broadens the synthesis methods and application scope of intelligent materials.

DETAILED DESCRIPTION OF THE EMBODIMENTS

Figure 1:
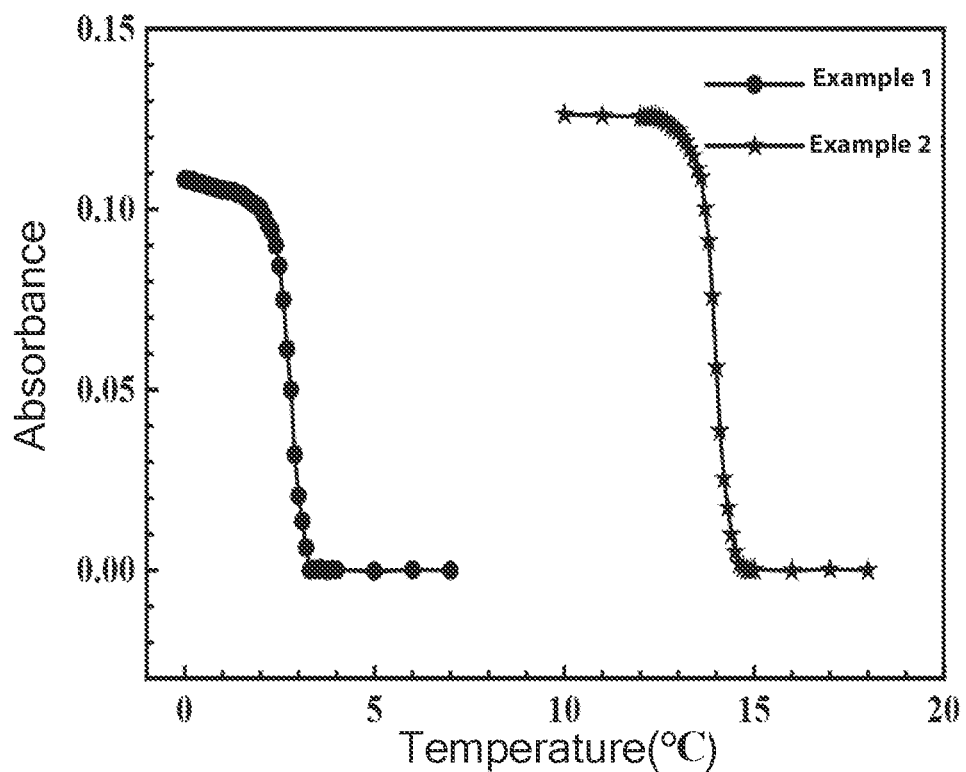
FIG. 1 shows a relationship between the absorbance of a solution of each of the polymers obtained in Examples 1 and 2 in i-propanol and the temperature.
Figure 2:
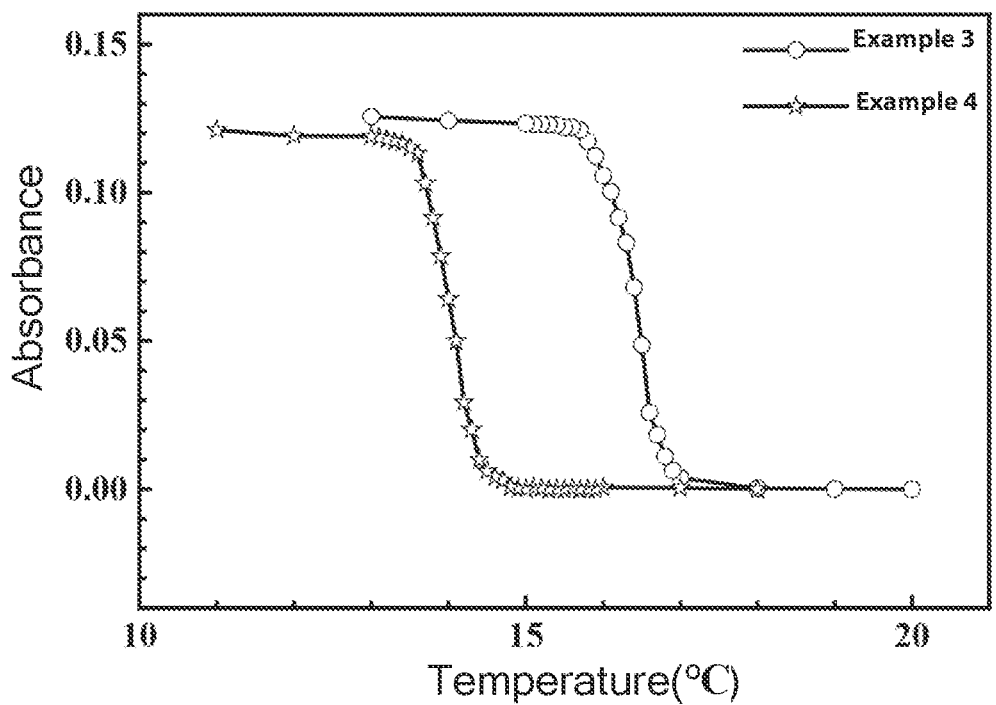
FIG. 2 shows a relationship between the absorbance of a solution of each of the polymers obtained in Examples 3 and 4 in i-propanol and the temperature.
Figure 3:
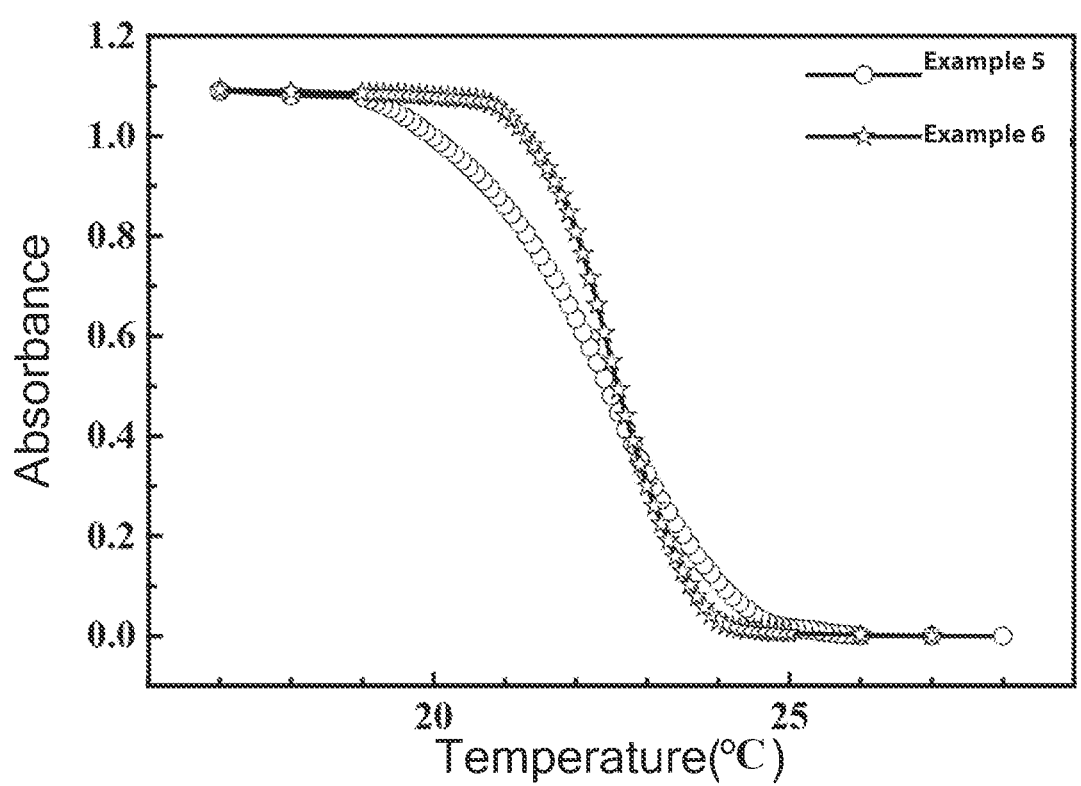
FIG. 3 shows a relationship between the absorbance of a solution of each of the polymers obtained in Examples 5 and 6 in i-propanol and the temperature.

The present disclosure is further described below with reference to examples, but is not limited thereto.

Example 1

PHEMA was prepared by inverse emulsion polymerization according to a ratio of [HEMA]:[MEMA]:[BPO]=40:1:1. A specific process was as follows: HEMA (0.0400 mol) was dissolved in water (300 wt % HEMA) to obtain an HEMA aqueous solution (25 wt %); the HEMA aqueous solution was added to a reaction flask with toluene (400 wt % HEMA), Span® 85 (5 wt % toluene), Tween® 80 (5 wt % toluene), and MEMA (0.0010 mol), a resulting mixture was thoroughly stirred, and oxygen was evacuated by vacuum-pumping; BPO (0.0010 mol) was added, and a resulting mixture reacted in a 25° C. water bath for 8 h, at which time, an HEMA conversion rate was determined to be 94.3%; demulsification was conducted with THF; and a resulting product was washed three times with water and dried, and then purified three times and dried to obtain the polymer. As measured by static and dynamic light scattering (SLS/DLS), the polymer had an absolute WAMW of $M_{w,MALLS}$=133,000 g/mol.

1 mg of the polymer was weighed and dissolved in i-propanol to obtain a 1 mg/mL solution, the solution was weighed, and an obtained mass was recorded; the solution was placed in a 60° C. oven for more than 24 h to ensure that the polymer was completely dissolved in the i-propanol, during which period, the solution was weighed at all times such that the volatilized solvent could be supplemented to ensure a constant concentration for the solution; after the solution was equilibrated at 7° C. for 1 h, the absorbance was determined with a UV-visible spectrophotometer; and then the temperature was gradually decreased, and at each temperature, the absorbance was determined after the solution was equilibrated for 10 min. It was found from the test that the absorbance of the solution underwent an abrupt increase at 2° C. to 3° C. during the temperature decreasing process, indicating a temperature response.

The MEMA was prepared by the following method: N-(3-aminopropyl)-N-methylaniline (commercially available), TEA, and isobutyryl chloride were dissolved in THF separately to obtain dilute solutions with a concentration of 1 g/10 mL; the N-(3-aminopropyl)-N-methylaniline solution was mixed with the TEA solution at 0° C. to 5° C., then the isobutyryl chloride solution was slowly added dropwise to a resulting mixture while the mixture was vigorously stirred, and reaction was conducted for 24 h; a resulting system was filtered to obtain a filtrate, and the solvent was removed from the filtrate by rotary evaporation to obtain a crude product; and the crude product was dissolved in diethyl ether, and a resulting solution was added dropwise to cold n-hexane for recrystallization to obtain the model reducing agent MEMA, where the N-(3-aminopropyl)-N-methylaniline, TEA, and isobutyryl chloride had a molar ratio of 1:1.5:1.2.

Example 2

PHEMA was prepared by inverse emulsion polymerization according to a ratio of [HEMA]:[MEMA]:[BPO]=200:1:1 (other conditions were the same as in Example 1). As measured by SLS/DLS, the polymer had an absolute WAMW of $M_{w,MALLS}$=1,605,000 g/mol. 1 mg of the polymer was weighed and dissolved in i-propanol to obtain a 1 mg/mL solution, the solution was weighed, and an obtained mass was recorded; the solution was placed in a 60° C. oven for more than 24 h to ensure that the polymer was completely dissolved in the i-propanol, during which period, the solution was weighed at all times such that the volatilized solvent could be supplemented to ensure a constant concentration for the solution; after the solution was equilibrated at 18° C. for 1 h, the absorbance was determined with a UV-visible spectrophotometer; and then the temperature was gradually decreased, and at each temperature, the absorbance was determined after the solution was equilibrated for 10 min. It was found from the test that the absorbance of the solution underwent an abrupt increase at 12° C. to 14° C. during the temperature decreasing process, indicating a temperature response.

Example 3

PHEMA was prepared by inverse emulsion polymerization according to a ratio of [HEMA]:[MPAEMA]:[BPO]= 80:1:1 (other conditions were the same as in Example 1). As measured by SLS/DLS, the polymer had an absolute WAMW of $M_{w,MALLS}$=2,442,000 g/mol. 1 mg of the polymer was weighed and dissolved in i-propanol to obtain a 1 mg/mL solution, the solution was weighed, and an obtained mass was recorded; the solution was placed in a 60° C. oven for more than 24 h to ensure that the polymer was completely dissolved in the i-propanol, during which period, the solution was weighed at all times such that the volatilized solvent could be supplemented to ensure a constant concentration for the solution; after the solution was equilibrated at 20° C. for 1 h, the absorbance was determined with a UV-visible spectrophotometer; and then the temperature was gradually decreased, and at each temperature, the absorbance was determined after the solution was equilibrated for 10 min. It was found from the test that the absorbance of the solution underwent an abrupt increase at 16° C. to 17° C. during the temperature decreasing process, indicating a temperature response.

The MPAEMA was prepared by the following method: N-(3-aminopropyl)-N-methylaniline (commercially available), TEA, and MAC were dissolved in THF separately to obtain dilute solutions with a concentration of 1 g/10 mL; the N-(3-aminopropyl)-N-methylaniline solution was mixed with the TEA solution at 0° C. to 5° C., then the MAC solution was slowly added dropwise to a resulting mixture while the mixture was vigorously stirred, and reaction was conducted for 24 h; a resulting system was filtered to obtain a filtrate, and the solvent was removed from the filtrate by rotary evaporation to obtain a crude product; and the crude product was dissolved in diethyl ether, and a resulting solution was added dropwise to cold n-hexane for recrystallization to obtain the reducing agent monomer MPAEMA, where the N-(3-aminopropyl)-N-methylaniline, TEA, and MAC had a molar ratio of 4:6:5.

Example 4

PHEMA was prepared by inverse emulsion polymerization according to a ratio of [HEMA]:[MPAEMA]:[BPO]= 120:1:1 (other conditions were the same as in Example 1). As measured by SLS/DLS, the polymer had an absolute WAMW of $M_{w,MALLS}$=1,671,000 g/mol. 1 mg of the polymer was weighed and dissolved in i-propanol to obtain a 1 mg/mL solution, the solution was weighed, and an obtained mass was recorded; the solution was placed in a 60° C. oven for more than 24 h to ensure that the polymer was completely dissolved in the i-propanol, during which period, the solution was weighed at all times such that the volatilized solvent could be supplemented to ensure a constant concentration for the solution; after the solution was equilibrated at 18° C. for 1 h, the absorbance was determined with a UV-visible spectrophotometer; and then the temperature was gradually decreased, and at each temperature, the absorbance was determined after the solution was equilibrated for 10 min. It was found from the test that the absorbance of the solution underwent an abrupt increase at 13° C. to 15° C. during the temperature decreasing process, indicating a temperature response.

Example 5

PHEMA was prepared by inverse emulsion polymerization according to a ratio of [HEMA]:[MEMA]:[BPO]=200: 1:1 (other conditions were the same as in Example 1). As measured by SLS/DLS, the polymer had an absolute WAMW of $M_{w,MALLS}$=1,605,000 g/mol. 1 mg of the polymer was weighed and dissolved in i-propanol to obtain a 15 mg/mL solution, the solution was weighed, and an obtained mass was recorded; the solution was placed in a 60° C. oven for more than 24 h to ensure that the polymer was completely dissolved in the i-propanol, during which period, the solution was weighed at all times such that the volatilized solvent could be supplemented to ensure a constant concentration for the solution; after the solution was equilibrated at 28° C. for 1 h, the absorbance was determined with a UV-visible spectrophotometer; and then the temperature was gradually decreased, and at each temperature, the absorbance was determined after the solution was equilibrated for 10 min. It was found from the test that the absorbance of the solution underwent an abrupt increase at 19° C. to 25° C. during the temperature decreasing process, indicating a temperature response.

Example 6

PHEMA was prepared by inverse emulsion polymerization according to a ratio of [HEMA]:[MPAEMA]:[BPO]= 120:1:1 (other conditions were the same as in Example 1). As measured by SLS/DLS, the polymer had an absolute WAMW of $M_{w,MALLS}$=1,671,000 g/mol. 1 mg of the polymer was weighed and dissolved in i-propanol to obtain a 15 mg/mL solution, the solution was weighed, and an obtained mass was recorded; the solution was placed in a 60° C. oven for more than 24 h to ensure that the polymer was completely dissolved in the i-propanol, during which period, the solution was weighed at all times such that the volatilized solvent could be supplemented to ensure a constant concentration for the solution; after the solution was equilibrated at 27° C. for 1 h, the absorbance was determined with a UV-visible spectrophotometer; and then the temperature was gradually decreased, and at each temperature, the absorbance was determined after the solution was equilibrated for 10 min. It was found from the test that the absorbance of the solution underwent an abrupt increase at 21° C. to 24° C. during the temperature decreasing process, indicating a temperature response.

Example 7

PHEMA was prepared by inverse emulsion polymerization according to a ratio of [HEMA]:[MEMA]:[BPO]=40: 1:1 (other conditions were the same as in Example 1). As measured by SLS/DLS, the polymer had an absolute WAMW of $M_{w,MALLS}$=133,000 g/mol. 1 mg of the polymer was weighed and dissolved in n-propanol to obtain a 5 mg/mL solution, the solution was weighed, and an obtained mass was recorded; the solution was placed in a 60° C. oven for more than 24 h to ensure that the polymer was completely dissolved in the n-propanol, during which period, the solution was weighed at all times such that the volatilized solvent could be supplemented to ensure a constant concentration for the solution; after the solution was equilibrated at 13° C. for 1 h, the absorbance was determined with a UV-visible spectrophotometer; and then the temperature was gradually decreased, and at each temperature, the absorbance was determined after the solution was equilibrated for 10 min. It was found from the test that the absorbance of the solution underwent an abrupt increase at 8° C. to 10° C. during the temperature decreasing process, indicating a temperature response.

Example 8

PHEMA was prepared by inverse emulsion polymerization according to a ratio of [HEMA]:[MPAEMA]:[BPO]= 120:1:1 (other conditions were the same as in Example 1). As measured by SLS/DLS, the polymer had an absolute WAMW of $M_{w,MALLS}$=1,671,000 g/mol. 1 mg of the polymer was weighed and dissolved in i-propanol to obtain a 7.5 mg/mL solution, the solution was weighed, and an obtained mass was recorded; the solution was placed in a 60° C. oven for more than 24 h to ensure that the polymer was completely dissolved in the i-propanol, during which period, the solution was weighed at all times such that the volatilized solvent could be supplemented to ensure a constant concentration for the solution; after the solution was equilibrated at 24° C. for 1 h, the absorbance was determined with a UV-visible spectrophotometer; and then the temperature was gradually decreased, and at each temperature, the absorbance was determined after the solution was equilibrated for 10 min. It was found from the test that the absorbance of the solution underwent an abrupt increase at 19° C. to 22° C. during the temperature decreasing process, indicating a temperature response.

Comparative Example 1

PHEMA was prepared by inverse emulsion polymerization according to a ratio of [HEMA]:[MEMA]:[BPO]=40:1:1 (other conditions were the same as in Example 1). As measured by SLS/DLS, the polymer had an absolute WAMW of $M_{w,MALLS}$=133,000 g/mol. 1 mg of the polymer was weighed and dissolved in methanol to obtain a 1 mg/mL solution, the solution was weighed, and an obtained mass was recorded; the solution was placed in a 60° C. oven for more than 24 h to ensure that the polymer was completely dissolved in the methanol, during which period, the solution was weighed at all times such that the volatilized solvent could be supplemented to ensure a constant concentration for the solution; after the solution was equilibrated at 40° C. for 1 h, the absorbance was determined with a UV-visible spectrophotometer; and then the temperature was gradually decreased, and at each temperature, the absorbance was determined after the solution was equilibrated for 10 min. It was found from the test that the absorbance of the solution underwent no significant change at 0° C. to 40° C. during the temperature decreasing process.

Comparative Example 2

PHEMA was prepared by inverse emulsion polymerization according to a ratio of [HEMA]:[MEMA]:[BPO]=40:1:1 (other conditions were the same as in Example 1). As measured by SLS/DLS, the polymer had an absolute WAMW of $M_{w,MALLS}$=133,000 g/mol. 1 mg of the polymer was weighed and dissolved in ethanol to obtain a 1 mg/mL solution, the solution was weighed, and an obtained mass was recorded; the solution was placed in a 60° C. oven for more than 24 h to ensure that the polymer was completely dissolved in the ethanol, during which period, the solution was weighed at all times such that the volatilized solvent could be supplemented to ensure a constant concentration for the solution; after the solution was equilibrated at 40° C. for 1 h, the absorbance was determined with a UV-visible spectrophotometer; and then the temperature was gradually decreased, and at each temperature, the absorbance was determined after the solution was equilibrated for 10 min. It was found from the test that the absorbance of the solution underwent no significant change at 0° C. to 40° C. during the temperature decreasing process.

Comparative Example 3

PHEMA was prepared by inverse emulsion polymerization according to a ratio of [HEMA]:[MPAEMA]:[BPO]= 80:1:1 (other conditions were the same as in Example 1). As measured by SLS/DLS, the polymer had an absolute WAMW of $M_{w,MALLS}$=2,442,000 g/mol. 1 mg of the polymer was weighed and dissolved in ethanol to obtain a 1 mg/mL solution, the solution was weighed, and an obtained mass was recorded; the solution was placed in a 60° C. oven for more than 24 h to ensure that the polymer was completely dissolved in the ethanol, during which period, the solution was weighed at all times such that the volatilized solvent could be supplemented to ensure a constant concentration for the solution; after the solution was equilibrated at 40° C. for 1 h, the absorbance was determined with a UV-visible spectrophotometer; and then the temperature was gradually decreased, and at each temperature, the absorbance was determined after the solution was equilibrated for 10 min. It was found from the test that the absorbance of the solution underwent no significant change at 0° C. to 40° C. during the temperature decreasing process.

Comparative Example 4

PHEMA was prepared by inverse emulsion polymerization according to a ratio of [HEMA]:[MEMA]:[BPO]=40:1:1 (other conditions were the same as in Example 1). As measured by SLS/DLS, the polymer had an absolute WAMW of $M_{w,MALLS}$=133,000 g/mol. 1 mg of the polymer was weighed and added to butanol to prepare a 1 mg/mL solution, but PHEMA was unable to be dissolved in butanol.

The above examples are preferred implementations of the present disclosure, but the present disclosure is not limited to the above implementations. Any obvious improvement, substitution, or modification made by those skilled in the art without departing from the essence of the present disclosure should fall within the protection scope of the present disclosure.

What is claimed is:

1. A preparation method of a poly(2-hydroxyethyl methacrylate) (PHEMA) temperature-responsive material, the method comprising: dissolving the PHEMA into an i-propanol solution of the PHEMA or an n-propanol solution of the PHEMA to obtain the temperature-responsive material, wherein the temperature-responsive material undergoes an abrupt increase in absorbance during a temperature decreasing process at a temperature range of 2° C. to 25° C., indicating a temperature response; the PHEMA has a weight average molecular weight (WAMW) of 133,000 g/mol to 2,442,000 g/mol.

2. The preparation method of the PHEMA temperature-responsive material according to claim 1, wherein the PHEMA has a concentration of 1 mg/mL to 15 mg/mL in the i-propanol solution or the n-propanol solution; and the i-propanol solution or the n-propanol solution of the PHEMA has a cloud point of 2° C. to 23° C.

3. The preparation method of the PHEMA temperature-responsive material according to claim 1, wherein a preparation method of the PHEMA is as follows: with a system consisting of benzoyl peroxide (BPO) (an oxidant) and 2-methyl-N-[3-(methyl-phenyl-amino)-propyl]-acrylamide (MPAEMA) or 2-methyl-N-[3-(methyl-phenyl-amino)-propyl]-propionamide (MEMA) (a reducing agent monomer) as a redox initiation system, water and toluene as media, polyoxyethylene (20) sorbitan monooleate and sorbitane trioleate as an emulsifier, and 2-hydroxyethyl methacrylate (HEMA) as a polymerization monomer, conducting a free-radical inverse emulsion polymerization at room temperature to obtain the PHEMA.

4. The preparation method of the PHEMA temperature-responsive material according to claim 3, wherein the MPAEMA is prepared by a method comprising:
(1) dissolving N-(3-aminopropyl)-N-methylaniline, tri-ethylamine (TEA), and methacryloyl chloride (MAC) in tetrahydrofuran (THF) separately to obtain an N-(3-aminopropyl)-N-methylaniline solution, a TEA solution and a MAC solution with a concentration of 1 g/10 mL; and
(2) mixing the N-(3-aminopropyl)-N-methylaniline solution with the TEA solution at 0° C. to 5° C. to obtain a first resulting mixture, slowly adding the MAC solution dropwise to the first resulting mixture while the first resulting mixture is vigorously stirred to obtain a second resulting mixture, and conducting a reaction on the second resulting mixture for 24 h to obtain a resulting system; filtering the resulting system to obtain a filtrate, and removing a solvent from the filtrate by a rotary evaporation to obtain a crude product; and dissolving the crude product in diethyl ether to obtain a resulting solution, and adding the resulting solution dropwise to cold n-hexane for a recrystallization to obtain the reducing agent monomer MPAEMA, wherein the N-(3-aminopropyl)-N-methylaniline, the TEA, and the MAC have a molar ratio of 4:6:5.

5. The preparation method of the PHEMA temperature-responsive material according to claim 3, wherein the MEMA is prepared by a method comprising:
(1) dissolving N-(3-aminopropyl)-N-methylaniline, TEA, and isobutyryl chloride in THF separately to obtain an N-(3-aminopropyl)-N-methylaniline solution, a TEA solution and an isobutyryl chloride solution with a concentration of 1 g/10 mL; and
(2) mixing the N-(3-aminopropyl)-N-methylaniline solution with the TEA solution at 0° C. to 5° C. to obtain a first resulting mixture, slowly adding the isobutyryl chloride solution dropwise to the first resulting mixture while the first resulting mixture is vigorously stirred to obtain a second resulting mixture, and conducting a reaction on the second resulting mixture for 24 h to obtain a resulting system; filtering the resulting system to obtain a filtrate, and removing a solvent from the filtrate by a rotary evaporation to obtain a crude product; and dissolving the crude product in diethyl ether to obtain a resulting solution, and adding the resulting solution dropwise to cold n-hexane for a recrystallization to obtain a model reducing agent MEMA, wherein the N-(3-aminopropyl)-N-methylaniline, the TEA, and the isobutyryl chloride have a molar ratio of 1:1.5:1.2.

6. The preparation method of the PHEMA temperature-responsive material according to claim 3, wherein the reducing agent monomer has a concentration of 25% in an aqueous solution of the reducing agent monomer; and a molar ratio of the oxidant to the reducing agent monomer is 1:1.

7. The preparation method of the PHEMA temperature-responsive material according to claim 3, wherein a molar ratio of the reducing agent monomer to the polymerization monomer is 1:80 to 1:200; and a mass ratio of the water to the toluene is 1:1.

8. The preparation method of the PHEMA temperature-responsive material according to claim 3, wherein a total mass of the polyoxyethylene (20) sorbitan monooleate and the sorbitane trioleate is 10% of a mass of the toluene, and a mass ratio of the polyoxyethylene (20) sorbitan monooleate and sorbitane trioleate is 1:1.

9. The preparation method of the PHEMA temperature-responsive material according to claim 3, wherein the free-radical inverse emulsion polymerization is conducted at 25° C. for 1 h to 8 h.

10. The preparation method of the PHEMA temperature-responsive material according to claim 2, wherein a preparation method of the PHEMA is as follows: with a system consisting of benzoyl peroxide (BPO) (an oxidant) and 2-methyl-N-[3-(methyl-phenyl-amino)-propyl]-acrylamide (MPAEMA) or 2-methyl-N-[3-(methyl-phenyl-amino)-propyl]-propionamide (MEMA) (a reducing agent monomer) as a redox initiation system, water and toluene as media, Polyoxyethylene (20) sorbitan monooleate and Sorbitane trioleate as an emulsifier, and 2-hydroxyethyl methacrylate (HEMA) as a polymerization monomer, conducting a free-radical inverse emulsion polymerization at room temperature to obtain the PHEMA.

* * * * *